United States Patent

[11] 3,602,700

| [72] | Inventors | Ronald E. Jerva;<br>Marion Kosem, both of Wickliffe, Ohio |
|---|---|---|
| [21] | Appl. No. | 804,558 |
| [22] | Filed | Mar. 5, 1969 |
| [45] | Patented | Aug. 31, 1971 |
| [73] | Assignee | Allen-Bradley Company<br>Milwaukee, Wis. |

[54] NUMERICALLY CONTROLLED MACHINE TOOLSLIDE-POSITION-INDICATING SYSTEM
10 Claims, 7 Drawing Figs.

[52] U.S. Cl.............................................. 235/92 MP,
235/151.11, 318/603, 235/92 PS
[51] Int. Cl.............................................. G05b 19/24
[50] Field of Search............................................. 318/20.320;
235/92 MP, 92 D, 92

[56] References Cited
UNITED STATES PATENTS

| 3,223,830 | 12/1965 | Evans............................ | 235/92 |
| 3,331,006 | 7/1967 | Strand et al.................... | 318/314 |
| 3,375,354 | 3/1968 | McGarrell..................... | 235/151.11 |
| 3,473,098 | 10/1969 | Waller.......................... | 318/18 |

*Primary Examiner*—Eugene G. Butz
*Attorneys*—Arnold T. Ericsen and Richard C. Steinmetz, Jr.

ABSTRACT: In a numerically controlled machine tool system of a type wherein the motion of a machine tool is controlled by comparing, for each axis the present location of the machine toolslide with a desired location, and generating command signals responsive to any difference between the two, there is provided display means for indicating the present slide location, the commanded end location, the present distance of the slide from its commanded end location, and the present velocity of the slide.

INVENTOR.
MARION KOSEM
RONALD E. JERVA

NUMERICALLY CONTROLLED MACHINE TOOL SLIDE-POSITION-INDICATING SYSTEM

BACKGROUND OF THE INVENTION

This invention relates to a slide position indicator for a numerical machine tool control system of a type which employs absolute positioning.

U.S. Pat. application Ser. No. 654,887, filed July 20, 1967, by Marion Kosem, describes a numerical control system including an absolute positioning system of the type wherein a command counter is used to store absolute command information, or the end location desired for the machine tool, a feedback counter is used to store the instantaneous position of a machine tool, and a reference counter is used as the absolute reference for the system. The command and feedback counter states are compared and the machine tool is commanded to move until their count states are identical. The command, feedback and reference counters are dynamic; that is, they are continuously running in response to a common clock. All information accordingly is stored in phase form. For a multiple-axis system, one command and one feedback counter are required per axis; however, only one reference counter is required per system.

For both control and monitoring purposes, it is desirable to know the present location of each slide of the machine tool, the commanded position, the present velocity, and the distance it still has to move. This information must be provided with accuracy despite the fact that the machine tool is operating.

SUMMARY OF THE INVENTION

The present invention is directed to an accurate and easy-to-read indicating system which operates substantially instantaneously, while a machine tool is operating, to indicate the aforementioned information.

In a numerical control machine tool system of the type briefly described herein, a reference counter is used to establish an absolute reference position or a zero slide position. A command counter stores the end point information for a slide and a feedback counter for each slide has its count modified by feedback pulses from the slide transducer. The feedback counter by the count indicates the instantaneous position of a slide. In order to determine slide position for each axis, the phase difference between the reference counter and feedback counter is detected. This provides a pulse having a width or duration equal to that phase difference. The oscillations of a clock frequency over the interval at that phase difference pulse are then counted and the count is displayed as the slide position.

If the phase difference between the reference counter and the command counter is detected and processed in the manner previously described, then an indication maybe provided of the distance that the slide has yet to travel to the commanded end point. A count of the feedback pulses made over a measured interval is used to indicate slide velocity.

DESCRIPTION OF THE PREFERRED EMBODIMENTS

FIGURE 1

Figure 1:
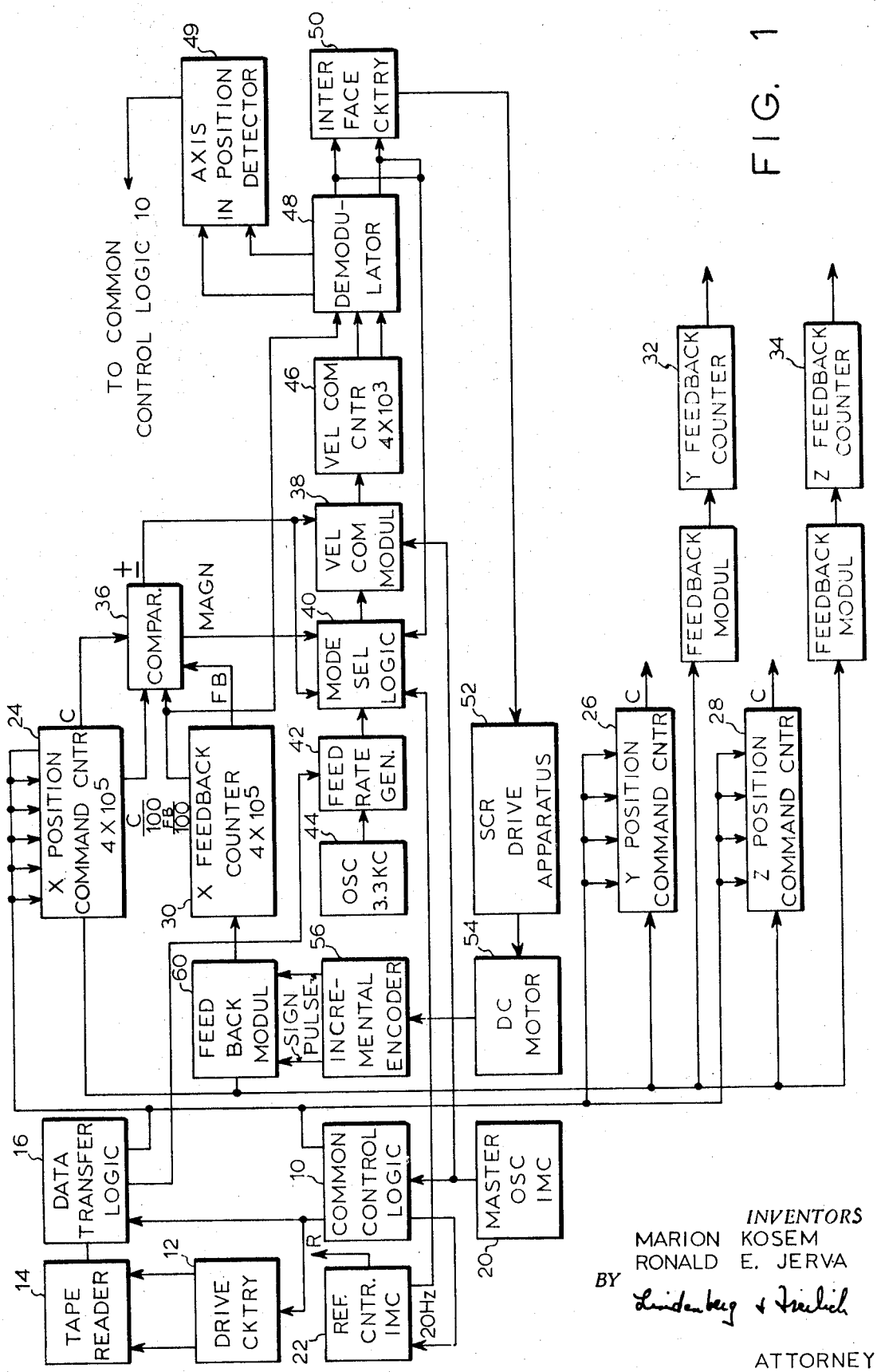
FIG. 1 is a block schematic diagram illustrating an absolute positioning system for a numerically controlled machine tool with which this invention may be employed.

FIG. 1 herein is the same as FIG. 1 of the aforementioned application for a numerical control system by Marion Kosem, Ser. No. 654,887, filed July 20, 1867. This drawing is being reproduced and an explanation thereof is being provided for the purpose of enabling an understanding of this invention.

A rectangle 10, labeled "Common Control Logic," performs the function of enabling tape reader drive circuitry 12 to advance tape on which numerical control data is recorded whereby a tape reader 14 can provide a pattern of output signals which represents instructions or commands to a numerically controlled machine tool system. These are the usual instructions as to which tool is to be used, the feedrate instructions, lubricant instructions, and instructions indicative of the end point location to which it is desired to move the machine tool table from the present location. These instructions are entered into circuitry 16, designated as "Tape Data Transfer Logic." This constitutes an arrangement of gates and registers which, under the control of the common control logic 10, stores some of this data for use during and after the machine tool motion and also transfers some of this data into other equipment which immediately commences operation in response thereto.

A master oscillator 20 is provided which, by way of example, can produce oscillations at a 1 megacycle frequency. There is also provided a reference counter 22 which serves the function of being an absolute reference for the system. Its output may be used for indicating the time for the occurrence of operations other than that of moving the machine tool table.

At the outset, there is entered into the respective axis position command counters 24, 26, 28 a number representing the end location desired for the machine tool table. The feedback counter 30, 32 or 34 for each axis provides the present or instantaneous location of the machine tool table, and the table is commanded to move until the location number in the position command counter is the same as the table position number in the feedback counter for each axis. Thus, at the outset, in response to the data in the tape data transfer logic circuitry 16, each one of the position command counters respectively 24, 26, and 28 is forced into a count condition representative of the end location desired for the table. At that time, the feedback counter will contain the present location of the table. It should be appreciated that this starting position need not be 0, 0, 0.

The length of these counters is dependent on the maximum dimension and desired positioning accuracy. For example, for a 100-inch system and a 0.0005-inch resolution, a counter having a $4 \times 10^5$ count length is required. Assuming a 1 megacycle input rate into the counters, a 5-cycle-per-second sampling rate results. Since this sampling rate is too low to be used directly by the servoelectronics usually associated with moving a machine tool table, an effective error signal of a much higher sampling rate must be generated.

The apparatus which will henceforth be described, is duplicated for each axis.

A comparator 36 is used to compare the phase of the outputs from the position command counter 24 and the feedback counter 30. It should be appreciated that each axis requires its own comparator. The comparator makes a comparison of the last count output from the position command counter C and the last count output of the feedback counter FB. The logical "not" form of these counts, $\overline{C}$ and $\overline{FB}$, is also provided. Also applied to the comparator from the respective position command counter and the feedback counter are the outputs of these counters which occur at respective counts C/100 and FB/100 and their logical "not" form $\overline{C}/100$ and $\overline{FB}/100$. Accordingly, assuming the counter is $4 \times 10^5$ counts in length and is being driven by a 1-megacycle-per-second signal, the C signal will occur at 2.5 cycles per second and the C/100 signal will occur at 250 cycles per second. The time of occurrence of the FB and the FB/100 outputs is determined by how fast the machine tool table is moving as well as the direction of its motion. This will become more clear as this explanation progresses.

The comparator 36, which is composed of a coarse and a fine demodulator, makes a decision on every sample of the coarse demodulator (five samples per second). If the distance to the desired end point for the machine tool table is indicated in the comparator as being greater than 1 inch (taken for illustrative purposes and not as a limitation on the invention), a constant level signal results. When the distance to the end point has been diminished to less than 1 inch, then the fine demodulator output (500 samples per second) of the comparator supplies a signal proportional to the actual error between the command and feedback counters. If overshoot occurs, an error signal of opposite polarity is generated to return this system to its commanded position. That output of the comparator which consists of sign information is applied to a velocity command modulator 38. Both sign and error signal magnitude information is supplied to a mode select logic arrangement 40.

A feedrate generator 42 has feedrate data entered therein from the tape data transfer logic 16 at the same time that position command data is entered into the position command counter 24. The feedrate generator 42 is driven in response to the output of a feedrate oscillator 44. The feedrate generator provides an output to the mode select logic 40 consisting of a pulse train occurring at a rate which is determined by the feedrate data word entered therein from the data transfer logic 16. Feedrate generator structure is well known in the numerical machine tool control field and appears in commercially sold machines. A suitable feedrate generator may be found described in detail and shown in a patent to P.H. McGarrell, U.S. Pat. No. 3,079,522. However, any of the well-known arrangements for producing a pulse train at a rate specified by a feedrate number may be employed here.

The mode select logic circuitry 40 determines the source of pulses which are to be supplied to the velocity control loop for the machine tool table. These are applied through the velocity command modulator 38 to a velocity command counter 46, whose output is applied to a demodulator 48, whose output in turn is applied to the usual interface circuitry 50, normally comprising a digital-to-analog circuit which converts pulse width signals to analog drive signals. The output of the interface circuitry is applied to a silicon control rectifier drive system 52, whose output is used to drive a DC motor 54 attached to the machine tool table (not shown). An incremental encoder 56, in response to the rotation of the shaft of the motor, generates a pulse for every increment of motion and also a sign signal indicative of the direction or sign of the motion. The pulse train and sign information are supplied to a feedback modulator 60. The purpose of the feedback modulator is to add or subtract the pulses received from the incremental encoder 56 to or from the 1-megacycle oscillations received from the master oscillator 20 through the common control logic 10, depending on the direction of rotation of the shaft of the motor and thus the direction of motion of the machine tool table, as indicated by the sign signal. Thus, 1-megacycle pulses, plus or minus the pulses received from the incremental encoder, are applied by the feedback modulator 60 to drive the feedback counter 30 until it is in phase with the position command counter 24 as detected by the comparator 36.

In order to better explain the function of the mode select logic 40, an example will be postulated. Assume that the distance to the desired end point for the machine tool table is greater than 1 inch. The sign signal output of the comparator determines the sign of the input to the velocity command modulator 38. Since the actual distance to the end point is now greater than the "following error," represented by the demodulator 48 output, pulses from the feedrate generator are passed to the velocity command modulator. The following error is an indication of the distance the machine tool is behind the command pulse train. The following error, which is created at the demodulator 48 output is also used in determining the source of the driving signals whether feedrate or 20 Hz. signals are supplied to the circuitry which follows.

As the tool proceeds toward the end point, a point is reached when the distance to the end point is less than or equal to the following error. When this condition is detected, the feedrate generator output is blocked and the machine tool table then moves, both in response to inertia and to the 20 Hz. pulse train provided by the reference counter. A constant deceleration is produced, and the following error begins to get smaller. At this time, error integration is begun. This assures the fact that the tool will reach the commanded position.

The velocity at which the machine tool is first commanded to move is originally determined from the feedrate number stored on the tape. This determines the frequency of the pulses received from the feedrate generator. In the feedrate mode of operation (the distance to the end point is greater than the following error), the feedrate pulses modulated on the 1-megacycle pulse create a phase shift in the velocity command counter. This counter has a count capacity corresponding to 1 inch. The output from this counter is compared by the demodulator 48 with a corresponding point in the feedback counter (FB/100), whereby a following error is created in the output of the demodulator 48. This following error, which is a digital signal, is then converted to a bipolar analog voltage by the interface circuitry 50. This bipolar analog voltage is then converted by the usual silicon control rectifier apparatus 52 to a motor drive signal.

The incremental encoder 56 can include a disc having an inner and an outer circular track adjacent to each other and placed near the outer periphery. Each track may contain alternating black and white indicia or spaced holes. Also, the indicia on the inner track alternates with the indicia on the outer track. Photoelectric apparatus placed opposite each track is used to generate two pulse trains, say A and B, which for one direction of disc rotation have pulses of train A leading pulses of train B, and vice versa for reverse rotation of the disc. Well-known logic converts these pulse trains into sign and pulse train signals as indicated. Devices of this sort are well known and are commercially purchasable. They are known as "incremental encoders" and are sold, for example, by the Trumpross Corporation of Boston, Massachusetts or by the Dynamics Research Corporation of Stoneham, Massachusetts. Thus, the incremental encoder converts the analog position information into pulse train and sign form. The quantized shaft rotation is then used to generate the absolute actual position of the machine tool table at any time.

When the count in the feedback counter and that in the position command counter are identical for each axis, the machine tool table has reached the designated position. At this time a signal is applied to the common control logic 10. The other instructions for the machine tool which are to be carried out when the machine tool table reaches a designated position may then be carried out. Thereafter, the tape reader and other circuits are energized to inject new counts into the respective position command counters and into the feedrate generator. As pointed out, the present invention is designed for an absolute input positioning system that operates on the phase shift between a reference, command, and feedback counter. The length of these counters is dependent on maximum dimension of the machine tool they control and the desired positioning accuracy. For a 100-inch system and 0.0005-inch resolution, a counter of $4 \times 10^5$ length is required. Assuming a 1 MHz. input rate into the counters, a 2.5 Hz., 50 percent duty cycles square wave results. The reference counter is used to establish an absolute reference, that is, zero slide position. The command counter stores the end point information and the feedback counter is modified by the back pulses from the slide transducer. If system resolution is 0.0005 inches, every 0.0005-inch step from absolute zero results in a $1\mu s$ phase shift between the feedback counter and the reference counter if the input to the feedback counter is 1 MHz. modulated by the transducer pulses.

Figure 2A:
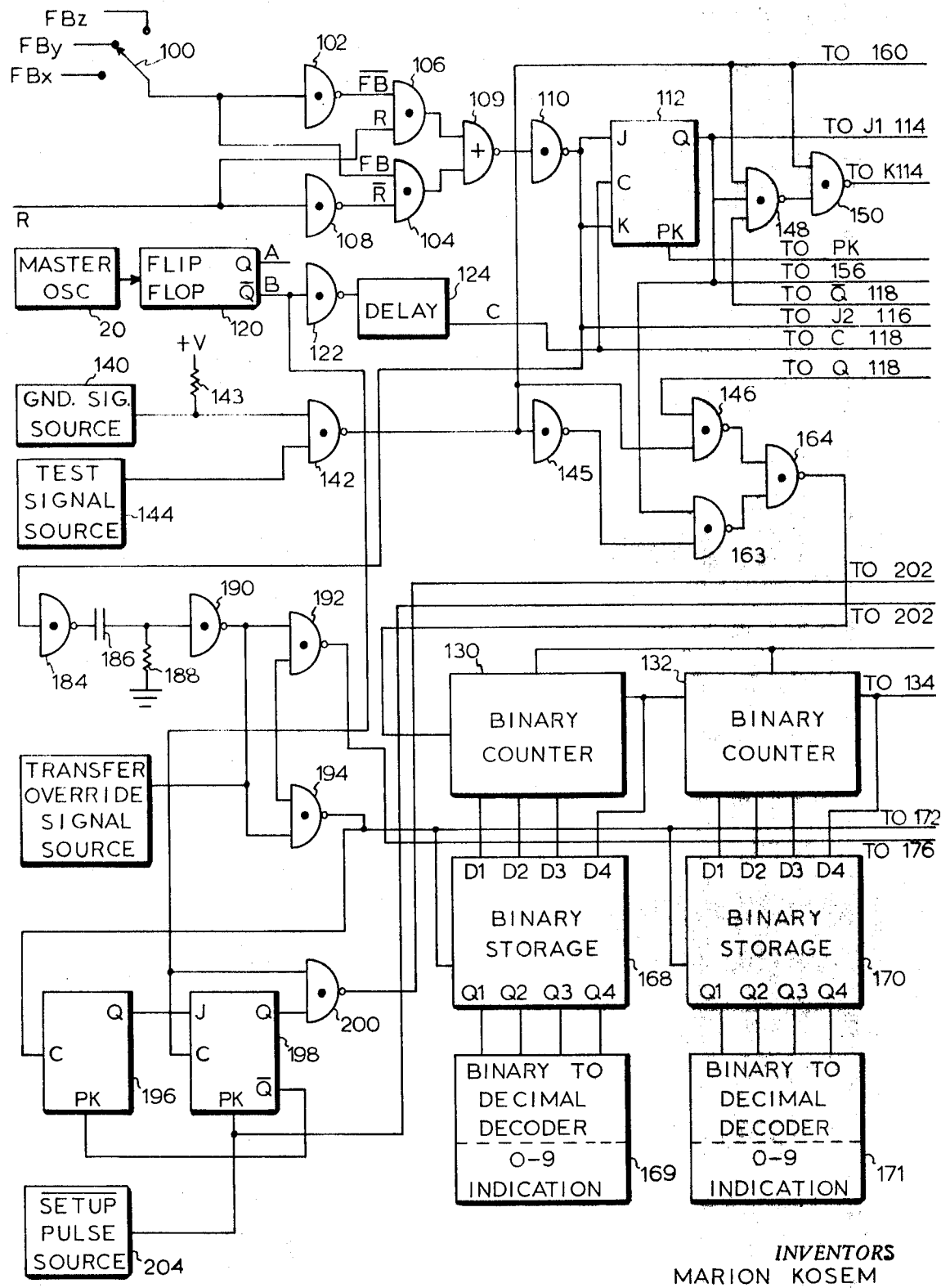
FIG. 2 is a block schematic diagram of an embodiment of the invention for indicating the position of the slides of a numerically controlled machine tool.
Figure 2B:
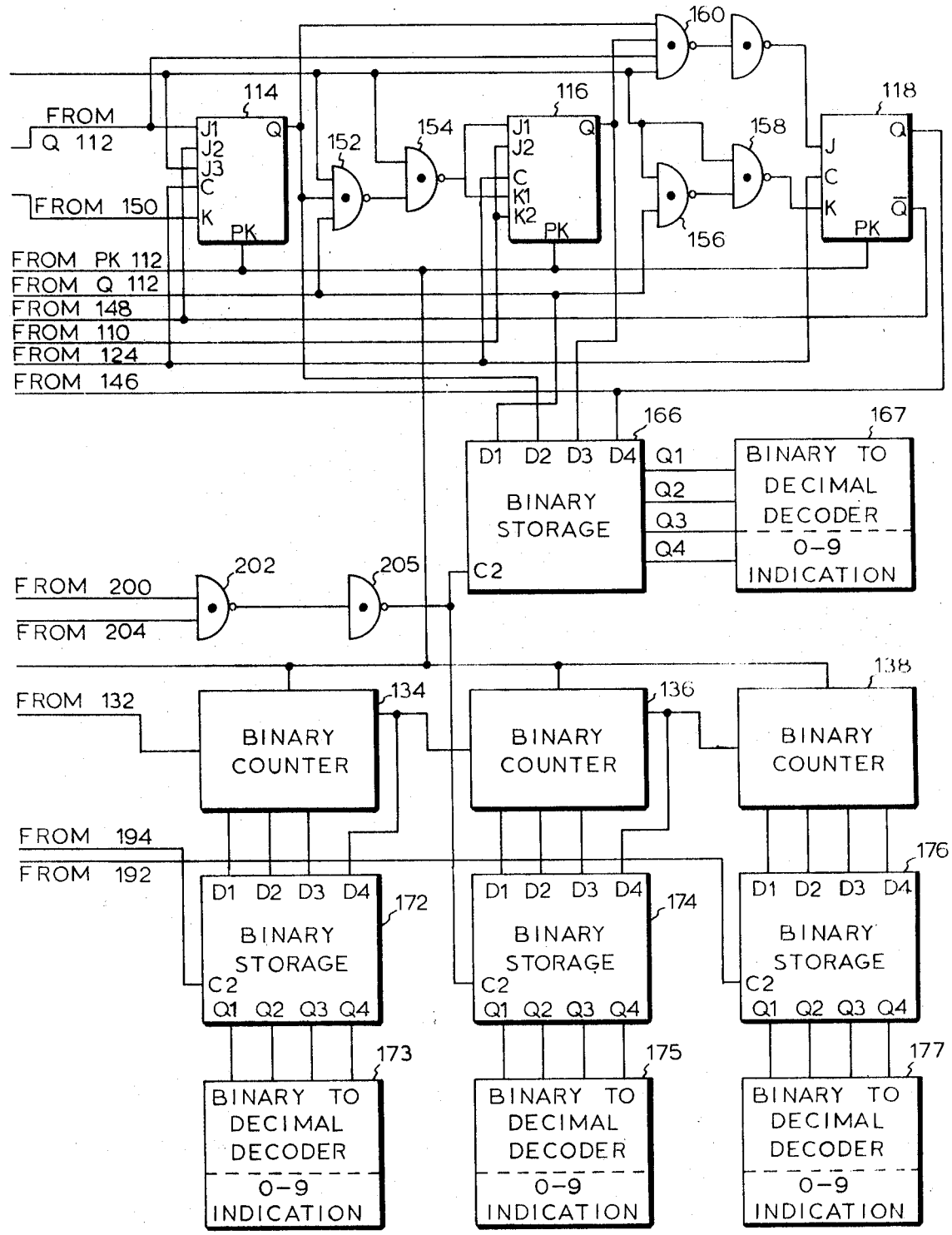

Accordingly, in order to determine slide position, the phase shift between the reference counter and feedback counter must be detected. The circuit arrangement for accomplishing this is shown in FIG. 2. One of these circuits is provided for each axis if it is desired to display the slide positions for the three axes simultaneously. Alternatively, one of these circuits may be provided with switching to the feedback output for each axis employing a selector switch 100. This switch enables connection to the last output stage of the X feedback counter, or the Y feedback counter, or the Z feedback counter.

FIGURES 2, 3, 4 and 5

The circuitry shown in FIG. 2 employs NAND gate logic, which as those skilled in the art will understand, effectively comprises and AND gate followed by an inverter. Where the NAND gate is shown having a single input, then it will be understood that the other input, which is not shown, is biased on, so that, when a signal is provided on the input which is shown, this signal is inverted. Therefore, it will be understood that the single-input NAND gates are actually inverters.

In order to determine slide position, the phase difference between the reference counter and the feedback counter must be detected. The feedback counter output is designated as FB and the reference counter corresponding count output is designated as R. The feedback counter output is applied to an inverter 102, and also as one input to an AND gate 104. The last stage output of the reference counter, designated as R, is applied as one input to an AND gate 106 and also to an inverter 108. The output of inverter 102, which is designated as $\overline{FB}$, is applied to AND gate 106. The output of the inverter 108, designated as $\overline{R}$, is applied to the AND gate 104. The outputs of AND gates 104 and 106 are applied to a NOR gate 109. The output of the NOR gate is applied to an inverter 110. The output of the inverter 110 is applied to the J and K inputs of a first flip-flop 112 and of a third flip-flop 116. These are the first and third flip-flops of a counter consisting of flip-flops 112, 114, 116 and 118.

The output of NOR gate 109 may be expressed in Boolean form as $R\overline{FB} + \overline{R}FB$. This constitutes the phase difference signal between the reference and feedback counters. The complement of this signal is applied to the counter which follows.

As indicated previously, each pulse applied by the feedback modulator to the feedback counter results in a 1-microsecond phase shift between the reference counter and the feedback counter, and each pulse represents 0.0005-inch slide movement. To convert the phase difference signal to a position indication, the phase difference signal is applied, in a manner to be described, to the counters 112, 114, 116, 118 to render the counter responsive to clock pulses. These clock pulses are derived from the master oscillator 20. The output of the master oscillator is applied to a flip-flop 120, to drive it successively between its two stable states. One of the flip-flop 120 outputs B, which is at half the master oscillator frequency, is applied to an inverter 122. The output of the inverter is then applied to a delay network 124. The delay network output is then applied to the clock inputs of all of the flip-flops 112, 114, 116 and 118.

The reason why the B output wave train is applied to a delay circuit 124 is because of the propagation delay which is found in the counter, which can occur from 240 nanoseconds to 500 nanoseconds after the negative transition of an A pulse (the other output of the flip-flop 120). The phase detector also accounts for a certain amount of delay. Thus, delay 124 ensures the correct arrival of the clock pulses.

Figure 3:
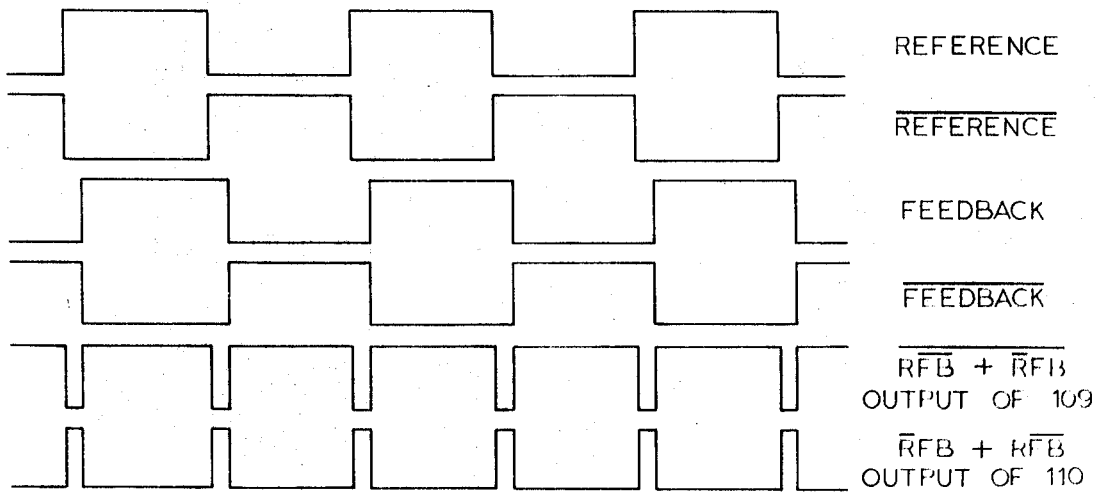
FIGS. 3, 4 and 5 are waveform diagrams shown to assist in an understanding of the invention.

FIG. 3 illustrates, by way of example, waveforms indicative of the outputs of the reference and feedback counters, as well as waveforms indicative of the output of NOR gate 109 and inverter 110. The latter two waveforms constitute pulses representative of the difference in phase between the reference and feedback counters.

Figure 4:
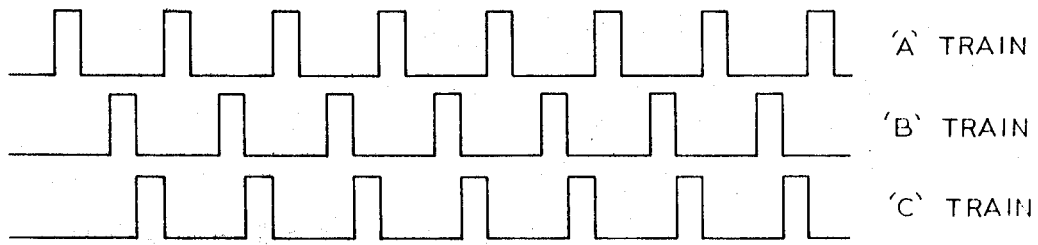

FIG. 4 illustrates a waveform representative of the A train of pulses, the B train of pulses, and the C train of pulses.

The counter consisting of four flip-flop stages is followed by five other binary decimal counters 130, 132, 134, 136, 138 having an identical construction, each of which has a 10-count capacity. Binary counter 130 is either driven by the Q output of flip-flop 112 or by the Q output of flip-flop 118 in a manner to be described. The overflow output of each one of the binary counters 130 through 138 is used to drive the succeeding binary counter in a well-known manner. Each one of the counters including the one shown in detail provides a binary-coded decimal output.

The resolution of the least significant digit of the slide readout device can be modified by the state of the ground signal source 140 or test source 144. Numerical control systems may have various resolutions, for instance; 0.0005 inch, 0.0001 inch, 0.001 inch, 0.001 mm., or 0.01 mm. This device can accommodate any of the above, dependent upon the state of terminal 140. The least significant digit composed of flip-flops 112, 114, 116 and 118 and associated logic can either divide by two or 10. If signal source 140 is logical "0," the least significant digit will divide by 10 and accommodate 0.0001 inch, 0.001 inch, 0.001 mm., or 0.01 mm. resolutions. If signal source 140 is high (and $\overline{TEST}$ is high) the least significant digit will divide by two and accommodate 0.0005 inch resolution or derated variations thereof (0.005 inch for instance), $\overline{TEST}$ forces the least significant digit to divide by 10 for frequency and velocity measurements as will be explained later. In order to implement the foregoing, the ground signal source 140 is connected to the input of NAND gate 142 which input is connected by a resistor 143 to a positive voltage source indicated as +V. The other input to the NAND gate 142 is derived from a test signal source 144. In the absence of the test signal, this input is high-logical 1. NAND gate 142 has its output connected to an inverter 145, to another NAND gate 146, and to other NAND gates 148, 150, 152, 154, 156, 158 and 160. NAND gates 148 through 160 are the gates which interconnect the flip-flops of the first counter and therefore, when they are disabled, they do not pass pulses from a lower stage of the counter to the succeeding stage. Accordingly, the only two flip-flops that will respond to the output of inverter 110 in the absence of a ground signal from source 140 or 144 are flip-flops 112 and 116. If the ground signal source grounds the +V potential or $\overline{TEST}$ switches low, then the output of NAND gate 142 goes high whereby the NAND gates 146 through 160 are enabled. This enables the counter made of flip-flops 112 through 118 to function as a binary decimal counter.

The effect of these operations on the counter capacity is that in the absence of a grounding signal from the source 140 or 144 the counter length is $2\times10^5$. Each pulse applied to the counter will have a weight of 0.0005 inches. The counter therefore counts in multiples of 5. In the presence of a grounding signal at the source 140 or 144, all flip-flops are enabled to respond to the input pulses and accordingly the entire counter capacity is $1\times10^6$ which can measure frequency or phase resolutions of from 0.001 inches or 0.0001 inches. The counter now counts in multiples of 1.

In the absence of the ground signal from the source 140, flip-flops 112 and 116 are toggled in parallel, and the output of the four flip-flop stages is 0000, 0101, 0000, etc. for each input pulse. This is represented by the waveform 162 shown in FIG. 5. When in this condition, each negative transition of the Q outputs of flip-flop 112 provides a carry pulse to binary counter 130 which is applied thereto over NAND gate 163, whose output is applied to the NAND gate 164, whose output in turn is the input to the binary counter 130.

Figure 5:
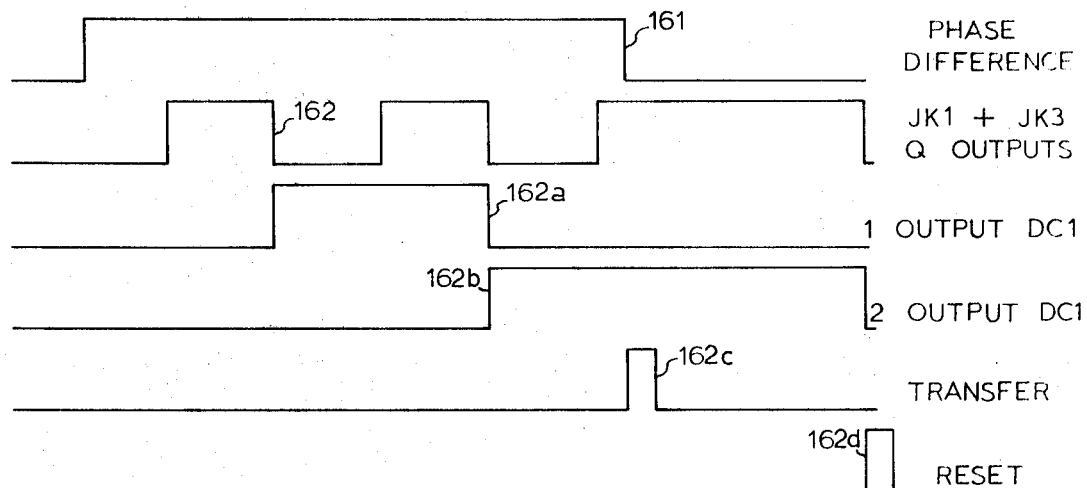

As shown in FIG. 5, at the first negative transition of waveform 162, the waveform 162a representative of the one output of counter 130, goes high. At the second negative going transition of waveform 162, waveform 162a goes low and a waveform 162b goes high, which is the number 2 output of counter 130.

The outputs of each one of the binary counters are connected to associated binary storage circuits, respectively 166, 168, 170, 172, 174, and 176. The outputs of each one of the binary storage circuits are connected to the respective binary to decimal decoder and indicator circuits 167, 169, 171, 173, 175, and 177. The respective binary storage circuits constitute four flip-flops which upon the application of a clock pulse assume the states and provide outputs which are identical with the states of their inputs. These flip-flops remain in such condition until the next clock pulse is applied thereto, whereupon their outputs duplicate the states of their inputs again. The clock is derived from the negative transition of the phase difference signal 161 and is obtained from the output of inverter 110. This is applied in turn to an inverter 184. The output of inverter 184 is converted to a single transfer pulse by the network including series capacitor 186, shunt resistor 188, and inverter 190. The output of inverter 190 is applied to two NAND gates, respectively 192 and 194. The other input to these two NAND gates is normally an enabling signal. This is obtained from a transfer override signal source which disenables these two NAND gates when it is desired to transfer zeros of the counter stages to the respective binary storage circuits.

The outputs of the two NAND gates 192 and 194 are respectively applied as clock inputs to all of the binary storage circuits 166 through 176.

The output of the NAND gate 194 is also applied to the clock input of a flip-flop 196 which applied its Q output to the J input terminal of another flip-flop 198. Flip-flop 198 receives clock pulses from the output of flip-flop 120. The Q output of flip-flop 198 is applied to a NAND gate 200, which is enabled upon the occurrence of every clock pulse. The output of the NAND gate 200 is applied to a succeeding NAND gate 202 which is OR'ed with the setup pulse from a setup pulse source 204. In the presence of a setup pulse, all flip-flops and counters are reset to their 0 states. The output of NAND gate 202 is applied to an inverter 205 whose output resets all of the counters to zero.

Considering now the operation of the counter in the absence of a signal from the ground signal source, the counter length is $2 \times 10^5$ and each clock pulse which toggles flip-flops 112 and 116 has a weight of 0.0005 inch. Thus, the display output in response to each clock pulse should indicate 0.0005, 0.0010, 0.0015, etc. Each negative transition of flip-flops 112 and 116 is the result of two clock pulse inputs. The Q outputs of flip-flops 112 and 116 are connected to the respective D1 and D3 inputs to binary storage circuits 166. The outputs designated as Q1 through Q4 correspond to the inputs D1 through D4 and have the weights 1, 2, 4, 8, respectively. Thus, in response to the first clock pulse, when flip-flops 112 and 116 have their Q outputs high, the output of the binary storage will indicate that the Q1 and Q3 outputs are high, corresponding to an output count of 5. The binary to decimal decoder 167 will thus indicate a 5. Upon the succeeding clock pulse being applied to flip-flops 112 and 116, their Q outputs go low whereby the binary storage circuit 166 outputs will indicate 0 while the binary counter 130 will have its D1 output high as the result of the negative transition or carry pulse being applied to its input through NAND gates 163 and 164. Accordingly, decimal decoder 169 will indicate a 1.

As represented by the waveforms 161, 162a, and 162b, in response to two negative-going transitions of the flip-flops 112 and 116 binary storage 166 output will represent a 0 and a binary storage 168 output will represent a 2. This is indicative of a phase difference of 0.0020 inches.

Since the clock pulse input to the binary storage circuits 166 through 176 occurs only upon the negative transition of the phase difference signal (represented by the waveform 161 in FIG. 5), the indicators 167 through 177 do not present an indication of the count of the counter until the negative transition of the phase difference signal 161 whereby a clock pulse, represented by the waveform 162c, is generated and applied through the NAND gates 192, 194 to the various binary storage circuits 166 through 176.

The transfer clock pulse in an embodiment of the invention which was built had a pulse width of 250-nanosecond duration. One microsecond after the transfer occurs, the counter is reset by operation of flip-flops 196 and 198 through NAND gate 200. This reset pulse is represented by the waveform 162d in FIG. 5.

FIGURE 6

Figure 6:
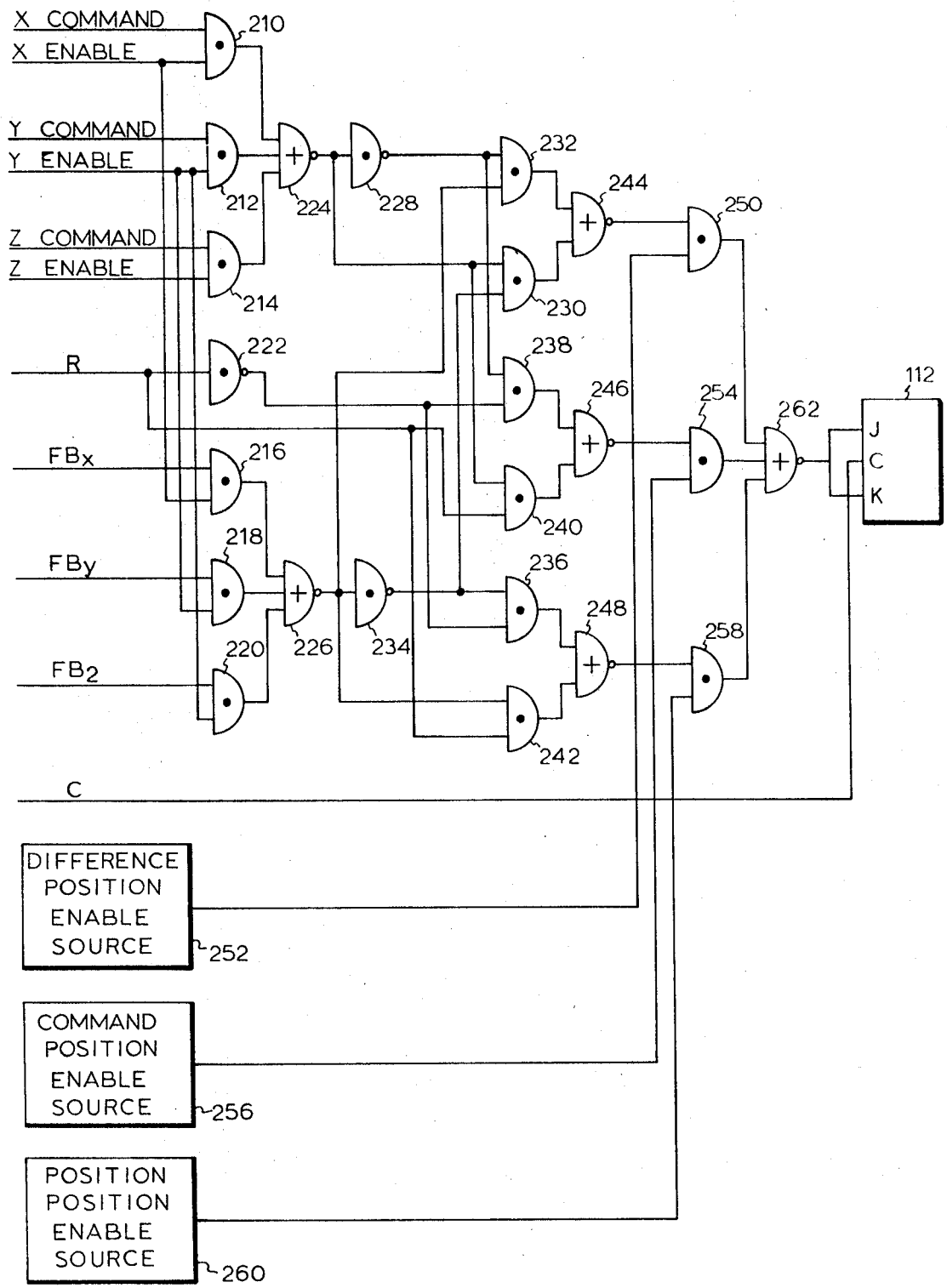
FIG. 6 is a block schematic diagram illustrating an embodiment of the invention for displaying the distance a slide has to travel to the commanded end position.

The description which preceded indicates that the slide position is determined by comparing the phase shift between the reference counter and the feedback counter. If the phase shift between the reference counter and the command counter is compared, the stored coordinate end point information or distance to go can be read. Comparing the phase shift between the command counter and the feedback counter results in the difference between the instantaneous slide position and the end point information. The logic necessary for this capability plus three axis switchable readout is shown in FIG. 6. The X, Y and Z command counter outputs C are respectively applied to the AND gates 210, 212, and 214. The outputs of the respective X, Y, and Z feedback counters are respectively applied to AND gates 216, 218, and 220. The output R of the reference counter is applied to an inverter 222. An X enable signal, to enable an output indication of the distance to the end point of the X slide, is applied to AND gates 210 and 216. A Y enable signal, to enable readout of the distance of the Y slide to the end-commanded position, is applied to the AND gates 212 ad 218. A Z enable signal, to enable readout of the distance of the Z slide to the end-commanded position, is enabled by application of this pulse to the AND gates 214 and 220. The X, Y and Z enable signals need only be a voltage from a voltage source which is connected in by operation of an X, Y or Z switch on the front panel of the machine.

The outputs of AND gates 210, 212 and 214 are applied to a NOR gate 224. The outputs of the AND gates 216, 218 and 220 are applied to a NOR gate 226. NOR gate 224 output is applied to an inverter 228 and also to an AND gate 230. The output of inverter 228 is applied to an AND gate 232. The second required input to AND gate 232 is the output of NOR gate 226. The output of NOR gate 226 is applied to inverter 234. The output of inverter 234 is the second required or enabling input to AND gate 230 and is also applied to an AND gate 236. Inverter 222 output is applied to an AND gate 238 and to the AND gate 236. The reference counter output is applied as a direct input to an AND gate 240 and to an AND gate 242. The second required input to AND gate 240 is the output of NOR gate 224. The second required input to AND gate 242 is the output of NOR gate 226.

The outputs of AND gates 230 and 232 are collected by a NOR gate 244. The outputs of AND gates 238 and 240 are collected by a NOR gate 246. The outputs of AND gates 236 an 242 are collected by a NOR gate 248. The output of NOR gate 244 is applied to an AND gate 250. The second enabling input to AND gate 250 is a signal from a "difference position" enabling source 252. The output of NOR gate 246 is applied to an AND gate 254 whose second required input is a signal derived from a "command position" enabling source 256. The output of NOR gate 248 is applied to an AND gate 258 whose second enabling input is derived from a "position, position" enabling source 260. These enabling sources need only be voltage sources connected in by operation of a switch on the front panel of the machine. The three outputs of AND gates 250, 254 and 258 are applied to a NOR gate 262. The output of the NOR gate is the input to flip-flop 112. The circuitry which follows flip-flop 112 is the same as that which is shown in FIG. 2.

The X, Y or Z enable signals serve the function of selecting which one of the axes information will be displayed. The signals applied by the respective sources 252, 256 and 260 determine what the information being displayed is. The combination of AND gates 230 and 232 and NOR gate 244 develops a phase shift signal between the select command and feedback counters which is an indication of the distance between the slide position and the end or commanded position. This is enabled by the output of the difference position source 252.

The combination of AND gates 238 and 240 and NOR gate 246 develops the phase shift signal between the selected command counter and the reference counter which is the end point information which is enabled to be displayed by the signal from the command position enabling source 256. The combination of AND gates 236 and 242 together with NOR gate 248 develops a phase shift signal representative of the difference between the feedback counter and the reference counter which is indicative of the slide position. This is displayed in response to a signal from the position, position enabling source 260.

The operation of the counter and display circuitry represented here by the flip-flop 112 should be obvious from FIG. 2 and the previous description.

FIGURE 7

Figure 7:
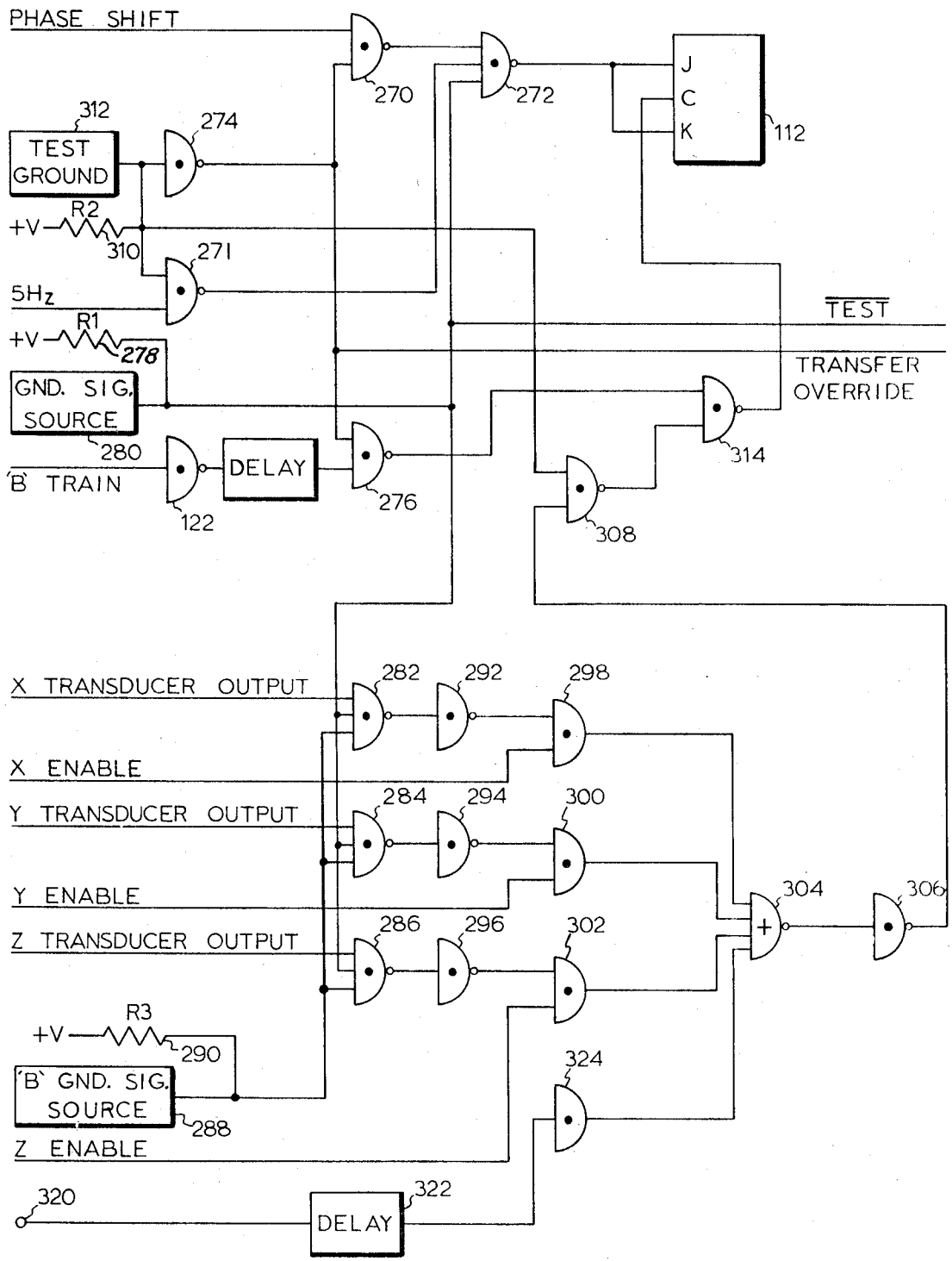
FIG. 7 is a block schematic diagram illustrating how the invention may be used for displaying slide position, commanded end position, the distance a slide has to travel, or slide velocity.

FIG. 7 shows an arrangement whereby the embodiment of the invention may be employed for measuring the velocity of each one of the slides in addition to indicating the previously described quantities. Any phase shift signals to be measured prior to being applied to the V and K inputs of flip-flop 112 are brought to a NAND gate 270. The output of NAND gate 270 is applied to a NAND gate 272. The output of NAND gate 272 is applied to the first stage 112 of the counter. The second input to NAND gate 270 is the output of an inverter 274, which is also applied to a NAND gate 276. This output also serves as a transfer override signal corresponding to the signal source shown in FIG. 2. The input to inverter 274 is a test position signal as from test signal source 144 shown in FIG. 2.

The test position signal is also applied to a NAND gate 271 which receives as its second input a 5-Hz. signal which may be derived from the reference counter. This 5-Hz. signal provides a square wave whose output remains high for 0.1 seconds. The output of NAND gate 271 constitutes a second input to NAND gate 272.

A third input to NAND gate 272 constitutes a positive voltage from a plus voltage source through a resistor 278 which can be grounded by a signal from a ground signal source 280. The feedback transducer for each axis yields, by way of example, in an embodiment of the invention which was built, 100 pulses for each revolution. Assuming one revolution per second or 100 pulses per second, 0.1 KHz. represents 3 inches per minute with a system revolution of 0.0005 inches. For a slide velocity of 100 inches per minute the display would indicate 3.33 KHz.

The X transducer output is applied to an NAND gate 282. The Y transducer output is applied to a NAND gate 284. The Z transducer output is applied to a NAND gate 286. The second required input to the three NAND gates 282, 284 and 286 is in the absence of a signal from the ground signal source a positive voltage through resistor 278. A third input to the NAND gates 282, 284 and 286 is either a B ground signal source 288 or a positive signal through resistor 290. The respective outputs of transducers 282, 284 and 286 are applied to the respective inverters 292, 294 and 296. The respective outputs of three inverters are applied respectively to three AND gates 298, 300 and 302. If an X slide velocity is desired to be displayed then an X enable signal is applied to the AND gate 298. If a Y slide velocity signal is desired to be displayed then a Y enable signal is applied to the AND gate 300. If a Z slide velocity is desired to be displayed then a Z enable signal is applied to the AND gate 302. The outputs of these three AND gates are applied to a NOR gate 304. The output of this NOR gate is inverted by inverter 306. The output of the inverter 306 is applied to a NAND gate 308 whose other input is derived through resistor 310 from a source of positive potential or in the alternative as grounded by a test position ground signal source 312.

The output of NAND gate 308 is applied to a NAND gate 314. The other input to this NAND gate is the output of NAND gate 276. The output of NAND gate 314 constitutes the clock signals to the flip-flop 112.

With the arrangement shown, with the ground signal sources 312, 280 and 288 off the apparatus serves to indicate the present position of the slides in the manner described in FIG. 2. When the test position ground 312 is enabled, NAND gates 271 and 274 are disenabled. By applying either an X, Y, or Z enable signal to the appropriate input lines, the output of NAND gate 272 will be the number of pulses provided by the one of the feedback transducers for which an enabling signal has been provided to one of the AND gates 298, 300, or 302 which occur during the interval that a 5 Hz. signal is high, as derived from the output of NAND gate 271. These signals will be counted by the counter following the flip-flop 112 and displayed as the selected slide velocity.

If the B ground signal source 288 is enabled, its output grounds the NAND gates 282, 284 and 286. The counter and the display system can then be used for measuring frequency. An unknown frequency is applied to terminal 320. This unknown frequency signal is delayed slightly by a delay circuit 322. The output of the delay circuit is inverted by inverter 324, and then applied to NOR gate 304. Thereafter, it is applied through the inverter 306, NAND gate 308, NAND gate 314, as a clock signal to the flip-flop 112. The unknown frequency may be measured against the enabling 5 Hz. signals received through the NAND gate 271 or if the ground point source 280 is enabled, then NAND gate 272 is disabled and the counter will respond directly to the unknown frequency. The counter then becomes a pulse accumulator and can be reset by the system reset arrangement, as shown in FIG. 2, to accept a new count. This allows the slide position readout to be used for test purposes when the numerical control system in which this readout is incorporated is malfunctioning or being set up for proper slide velocity etc.

The foregoing description has shown how an arrangement in accordance with this invention can be used for the purpose of displaying for a numerical machine tool control system, the position of each one of the slides, or the distance of each slide from its commanded end location, or the velocity of each slide, or the frequency of any signals in the system, or as a pulse accumulator.

The embodiments of the invention in which an exclusive property or privilege is claimed are defined as follows:

1. In a numerical control system of a type wherein for each axis, a reference counter provides a count indication of the starting position of a slide for that axis, there is introduced into a command counter a count indicative of a desired end location for the slide, a feedback transducer provides an output pulse train comprising feedback pulses wherein each pulse is indicative of an increment of motion moved by said slide, said feedback counter having entered thereinto the initial location of said slide, and a reference frequency source supplies pulses to said reference counter, to said command counter, and pulses from said reference frequency source are combined with the feedback pulses and the resultant is applied to said feedback counter, a system for indicating the present location along each axis of a slide comprising:

means for each axis for detecting the phase difference between the count of said feedback counter and the count of said reference counter;

means for converting said phase difference into a count representative of said phase difference; and means for displaying said count.

2. Apparatus as recited in claim 1 wherein said means for converting said phase difference into a count includes means for generating clock pulses responsive to said reference frequency signals, means for converting said phase difference into a phase difference pulse having a width representative thereof, and counter means for counting the number of pulses occurring during the width interval of said phase difference pulse.

3. Apparatus as recited in claim 1 wherein there is included means for each axis for indicating the distance a slide has to travel to a commanded end point comprising:

means for each axis for detecting the phase difference between said feedback counter and said command counter, and means for applying said phase difference to said means for converting said phase difference into a count representative of said phase difference.

4. In a numerical control system of a type wherein for each axis a reference counter provides a count indication of the starting position of a slide for that axis, there is introduced into a command counter a count indicative of a desired end location for the slide, a feedback transducer provides an output pulse train wherein each pulse is indicative of an increment of motion moved by said slide, said feedback counter having entered thereinto the initial location of said slide, and a reference frequency source supplies pulses to said reference counter, to said command counter, and the pulses from said reference source are combined with the feedback pulses and the resultant is applied to said feedback counter, a system for indicating the present location of a slide along an axis comprising:
    means for each axis for generating a phase difference pulse having a width equal to the difference between a count of said feedback counter and count of said command counter,
    means for generating clock pulses,
    counter means,
    means for enabling said counter means to count pulses from said clock pulse source only during the interval of said phase difference pulse,
    storage means connected to said counter means for storing the count of said counter means,
    means responsive to the occurrence of said trailing edge of said phase difference pulse for generating a storage entry pulse,
    means for applying said storage entry pulse to said storage means to enable it to store the count of said counter means, and
    indicator means coupled to the output of said storage means for indicating the count stored therein.

5. Apparatus as recited in claim 1 wherein there is included means for measuring the velocity of a slide along each axis comprising:
    means for generating clock pulses,
    counter means,
    means for applying the output of a feedback transducer to said counter means only during the interval provided by one of said clock pulses, and
    means for displaying the count in said counter means.

6. Apparatus as recited in claim 1 wherein said means for detecting the phase difference between said feedback and said reference counter comprises a first inverter circuit,
    a second inverter circuit,
    a first AND gate,
    a second AND gate, and
    a NOR gate circuit,
    means for applying a predetermined count of said feedback counter to said first inverter circuit and one input of said second AND gate,
    means for applying a predetermined count of said reference counter to said second inverter circuit and to one input of said first AND gate,
    means for applying said first inverter output to a second input of said first AND gate to enable said second AND gate,
    means for applying said second inverter output to a second input of said second AND gate to enable said second AND gate, and
    means for applying the outputs of said first and second AND gates to said NOR circuit input whereby the output of said NOR circuit is a pulse having a width determined by the phase difference between said feedback and reference counter.

7. In a numerical control system of a type wherein for each axis a reference counter provides a count indication of the starting position of a slide for that axis, there is introduced into a command counter a count indicative of a desired end location for the slide, a feedback transducer provides an output pulse train wherein each pulse is indicative of an increment of motion moved by said slide, said feedback counter having entered thereinto the initial location of said slide, and a reference frequency source supplies pulses to said reference counter, to said command counter, and the pulses from said reference source are combined with the feedback pulses and the resultant is applied to said feedback counter, a system for indicating the present location of a slide along an axis comprising:
    means for each axis for generating a phase difference pulse having a width equal to the difference between a count of said reference counter and said feedback counter;
    means for generating clock pulses;
    counter means;
    means for enabling said counter means to count pulses from said clock pulse source only during the interval of said phase difference pulse;
    storage means connected to said counter means for storing the count of said counter means;
    means responsive to the occurrence of said trailing edge of said phase difference pulse for generating a storage entry pulse;
    means for applying said storage entry pulse to said storage means to enable it to store the count of said counter means; and
    indicator means coupled to the output of said storage means for indicating the count stored therein.

8. In a numerical control system as recited in claim 7 wherein said means for generating a phase difference pulse having a width equal to the difference between a count of said reference counter and said feedback counter includes a first inverter circuit,
    a second inverter circuit,
    a first AND gate,
    a second AND gate, and
    a NOR gate circuit,
    means for applying a predetermined count of said feedback counter to said first inverter circuit and one input of said second AND gate,
    means for applying a predetermined count of said reference counter to said second inverter circuit and to one input of said first AND gate,
    means for applying said first inverter output to a second input of said first AND gate to enable said first AND gate,
    means for applying said second inverter output to a second input of said second AND gate to enable said second AND gate, and
    means for applying the outputs of said first and second AND gates to said NOR circuit input whereby the output of said NOR circuit is a pulse having a width determined by the phase difference between said feedback and reference counters.

9. In a numerical control system as recited in claim 7 wherein there is included means for each axis for indicating the distance a slide has to travel to a commanded end point comprising:
    means for each axis for detecting the phase difference between said feedback counter and said command counter, and
    means for enabling said counter means to count pulses from said clock pulse source only during the interval of the phase difference between said feedback counter and said command counter.

10. In a numerical control system of a type wherein for each axis, a reference counter provides a count indication of the starting position of a slide for that axis, there is introduced into a command counter a count indicative of a desired end location for the slide, a feedback transducer provides an output pulse train comprising feedback pulses wherein each pulse is indicative of an increment of motion moved by said slide, said feedback counter having entered thereinto the initial location of said slide, and a reference frequency source supplies pulses to said reference counter, to said command counter, and pulses from said reference frequency source are combined with the feedback pulses and the resultant is applied to said feedback counter, a system for indicating the present location along each axis of a slide comprising:

means for each axis for detecting the phase difference between the count of said feedback counter and the count of said command counter, means for converting said phase difference to a plurality of pulses representative thereof, means for counting said plurality of pulses, and means for indicating the count in said means for counting.

PO-1050
(5/69)

UNITED STATES PATENT OFFICE
CERTIFICATE OF CORRECTION

Patent No. 3,602,700           Dated   August 31, 1971

Inventor(s)    Ronald E. Jerva; Marion Kosem

It is certified that error appears in the above-identified patent and that said Letters Patent are hereby corrected as shown below:

Column 2, Line 6     "1867" should read --1967--

Column 2, Line 64    "C" should read --(C)--

Column 2, Line 65    "FB" should read --(FB)--

Column 2, Line 66    "$\overline{C}$ and $\overline{FB}$" should read --($\overline{C}$ and $\overline{FB}$)--

Column 7, Line 59    "161" should read --162--

Column 8, Line 26    "ad" should read --and--

Column 9, Line 22    "V" should read --J--

Column 11, Line 66   "second" should read --first--

Signed and sealed this 29th day of February 1972.

(SEAL)
Attest:

EDWARD M. FLETCHER, JR.       ROBERT GOTTSCHALK
Attesting Officer               Commissioner of Patents